(12) United States Patent
Watanabe et al.

(10) Patent No.: US 8,827,318 B2
(45) Date of Patent: Sep. 9, 2014

(54) FLUID PASSAGE CONNECTING DEVICE AND REFRIGERATING CYCLE APPARATUS HAVING THE SAME

(75) Inventors: Hiroshi Watanabe, Kariya (JP); Akihito Higashihara, Chiryu (JP); Toshikazu Matsuda, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/474,015

(22) Filed: May 17, 2012

(65) Prior Publication Data
US 2012/0299292 A1 Nov. 29, 2012

(30) Foreign Application Priority Data
May 25, 2011 (JP) ................. 2011-117196

(51) Int. Cl.
*F16L 41/00* (2006.01)
*F16L 23/22* (2006.01)
*F16L 41/08* (2006.01)
*F25B 41/00* (2006.01)

(52) U.S. Cl.
CPC ............ *F16L 23/22* (2013.01); *F25B 41/003* (2013.01); *F16L 41/086* (2013.01)
USPC .......................... 285/206; 285/205

(58) Field of Classification Search
USPC ............ 285/206, 124.3, 335, 338, 347, 328, 285/205
See application file for complete search history.

(56) References Cited

U.S. PATENT DOCUMENTS

| | | | | |
|---|---|---|---|---|
| 2,525,799 A | * | 10/1950 | Hecker | 137/515.7 |
| 4,471,978 A | * | 9/1984 | Kramer | 285/321 |
| 4,589,688 A | * | 5/1986 | Johnson | 285/12 |
| 6,260,851 B1 | * | 7/2001 | Baron | 277/603 |
| 6,702,258 B1 | * | 3/2004 | Pettinaroli | 251/315.01 |
| 6,969,094 B2 | | 11/2005 | Frohling et al. | |
| 7,434,849 B2 | * | 10/2008 | Takeuchi et al. | 285/347 |
| 7,766,391 B2 | * | 8/2010 | Kim et al. | 285/205 |
| 2003/0080554 A1 | * | 5/2003 | Schroeder et al. | 285/125.1 |
| 2004/0178631 A1 | | 9/2004 | Frohling et al. | |
| 2004/0245773 A1 | * | 12/2004 | Schneider | 285/205 |
| 2008/0191475 A1 | * | 8/2008 | Postler | 285/328 |

FOREIGN PATENT DOCUMENTS

| | | |
|---|---|---|
| JP | 56-093584 | 7/1981 |
| JP | 04-046289 | 2/1992 |
| JP | 06-011211 | 1/1994 |
| JP | 07-208661 | 8/1995 |

(Continued)

OTHER PUBLICATIONS

Office Action issued May 7, 2013 in corresponding Japanese Application No. 2011-117196 (with English translation).

(Continued)

*Primary Examiner* — Aaron Dunwoody
(74) *Attorney, Agent, or Firm* — Harness, Dickey & Pierce, PLC (57) ABSTRACT

A first component and a second component are connected with each other in a manner that a first passage of the first component and a second passage of the second component communicate with each other through a communication part. A seal component is disposed between the first component and the second component to provide a sealing between the first passage and the second passage. A ring component is arranged to surround the communication part, and is located adjacent to the communication part rather than the seal component. The ring component restricts the communication part from having an excess increase in a cross-sectional area.

8 Claims, 9 Drawing Sheets

(56) References Cited

FOREIGN PATENT DOCUMENTS

| JP | 07-217779 | 8/1995 |
| JP | 07-248079 | 9/1995 |
| JP | 2000-213672 | 8/2000 |
| JP | 2008-057826 | 3/2008 |

OTHER PUBLICATIONS

Office Action dated Feb. 27, 2014 in corresponding Chinese Application No. 2012 10160282.2.

* cited by examiner

FLUID PASSAGE CONNECTING DEVICE AND REFRIGERATING CYCLE APPARATUS HAVING THE SAME

CROSS REFERENCE TO RELATED APPLICATION

This application is based on Japanese Patent Application No. 2011-117196 filed on May 25, 2011, the disclosure of which is incorporated herein by reference in its entirety.

TECHNICAL FIELD

The present disclosure relates to a fluid passage connecting device and a refrigerating cycle apparatus having the fluid passage connecting device.

BACKGROUND

JP-7-208661A, JP-7-217779A and JP-2008-57826A describe a fluid passage connecting device having a male component and a female component. The male component has a convex portion, and a seal component such as an O-ring is arranged around an outer circumference of the convex portion. When the male component is combined with the female component to define a fluid passage, a level difference is generated on an inner surface of the fluid passage. Further, a clearance is generated in an axis direction between a tip end of the male component and an inner wall of the female component. The clearance causes fluid turbulence, and the fluid turbulence causes noise.

JP-3936697B2 (US 2004/0178631, U.S. Pat. No. 6,969,094) describes a fluid passage connecting device having a male component and a female component. The male component has a convex portion, and a seal ring is arranged on surface of an axial end part of the convex portion. An inner diameter of the seal ring is approximately the same as that of the convex portion. The seal ring is tightly interposed between the male component and the female component in the axis direction.

In JP-3936697B2, a level difference is restricted from being generated on an inner surface of a fluid passage because the seal ring is arranged to be exposed to the fluid passage. However, the seal ring is arranged not only for the restriction of the level difference but also for achieving sealing property for fluid, so that it is difficult to achieve both of the restriction of the level difference and the sealing property.

Moreover, in order to maintain high sealing property, high dimensional accuracy is required for the male component, the female component and the seal ring.

SUMMARY

It is a first object of the present disclosure to provide a fluid passage connecting device in which noise is reduced in a passage having high sealing property. It is a second object of the present disclosure to provide a refrigerating cycle apparatus having the fluid passage connecting device.

According to a first example of the present disclosure, a fluid passage connecting device includes a first component, a second component, a seal component and a ring component. The first component defines a first passage. The second component defines a second passage, and is connected with the first component in a manner that the first passage and the second passage communicate with each other through a communication part. The seal component is disposed between the first component and the second component to provide a sealing between the first passage and the second passage. The ring component is arranged to surround the communication part, and is located adjacent to the communication part rather than the seal component. The ring component restricts the communication part from having an excess increase in a cross-sectional area.

Accordingly, noise is restricted from being generated in the communication part while high sealing property is achieved by the seal component.

According to a second example of the present disclosure, a refrigerating cycle apparatus includes the fluid passage connecting device.

Accordingly, the refrigerating cycle apparatus is restricted from having excess increase in a cross-sectional area of a refrigerant passage.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments of the present invention will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The correspondence in the embodiments is indicated by providing reference numerals in which only the hundred place is made different. The parts may be combined even if it is not explicitly described that the parts can be combined. The embodiments may be partially combined even if it is not explicitly described that the embodiments can be combined, provided there is no harm in the combination.

First Embodiment

Figure 1:
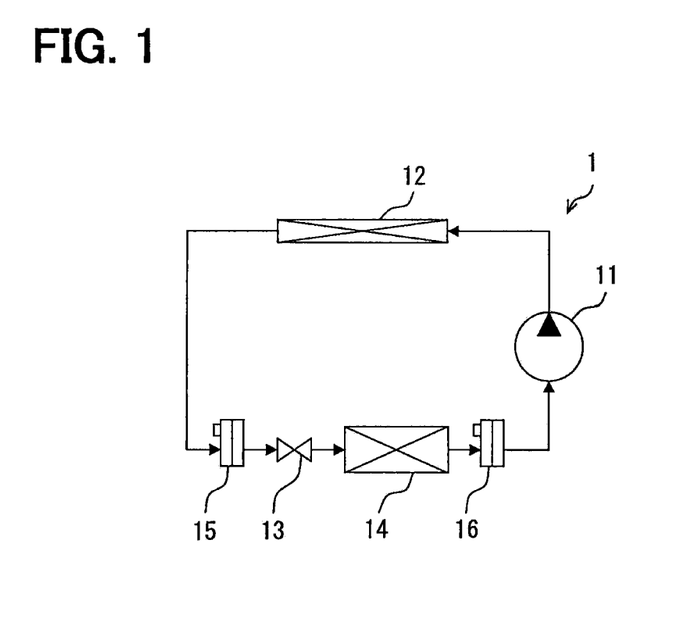
FIG. 1 is a block diagram illustrating a refrigerating cycle apparatus including a fluid passage connecting device according to a first embodiment.

A fluid passage connecting device 16 according to a first embodiment is applied to a refrigerating cycle apparatus 1 mounted to a vehicle. The refrigerating cycle apparatus 1 corresponds to an air cooling device of an air-conditioner that conditions a temperature of air in a passenger compartment of the vehicle.

As shown in FIG. 1, the refrigerating cycle apparatus 1 has a compressor 11, a condenser 12, a decompressor 13 and an evaporator 14 in addition to the fluid passage connecting device 16. The compressor 11, the condenser 12, the decompressor 13, and the evaporator 14 are arranged in this order in a refrigerant circuit through which refrigerant flows.

The compressor 11 draws and pressurizes low-pressure refrigerant, and discharges the high-pressure refrigerant. The condenser 12 is a radiator that causes the high-pressure refrigerant to radiate heat so as to condense the refrigerant. The refrigerant is condensed by exchanging heat with air outside of the passenger compartment.

The decompressor 13 decompresses the high-pressure refrigerant flowing out of the condenser 12, and supplies the low-pressure refrigerant to the evaporator 14. The evaporator 14 is a heat exchanger causing the refrigerant to absorb heat. The evaporator 14 cools air to be supplied to the passenger compartment by exchanging heat with the air. The decompressor 13 and the evaporator 14 may be integrated into a unit, and the unit may be fixed to the air-conditioner.

The refrigerating cycle apparatus 1 has plural passage portions which form a refrigerant passage defining the refrigerant circuit. The passage portion is made of a pipe or a component having a communication hole inside. The refrigerating cycle apparatus 1 is equipped with at least one fluid passage connecting device. Two passage portions located adjacent with each other are connected with each other by the fluid passage connecting device. The refrigerant corresponds to fluid, and the fluid passage connecting device connects passages through which the fluid flows.

For example, the refrigerating cycle apparatus 1 has a high-pressure fluid passage connecting device 15 arranged in a high-pressure passage through which high-pressure refrigerant flows, in addition to the low-pressure fluid passage connecting device 16 arranged in a low-pressure passage through which low-pressure refrigerant flows. The connecting devices 15 and 16 may be integrated and used as a connecting device for a unit constructed by the decompressor 13 and the evaporator 14.

In the refrigerating cycle apparatus 1, low-pressure refrigerant may cause noise within the range of human hearing at a part where the shape of the passage is rapidly changed. The flow velocity of low-pressure refrigerant may be higher than the flow velocity of high-pressure refrigerant, and the difference in the flow velocity may be one of the reasons for the noise generation.

Moreover, the refrigerating cycle apparatus 1 may be equipped with a plurality of the low pressure connecting devices, among which the connecting device 16 is located downstream of the evaporator 14 in or near the passenger compartment, so that the noise is easy to be heard by human.

In this embodiment, a noise reduction component that reduces the noise is added only to the connecting device 16 through which low-pressure refrigerant flows. Therefore, passage cross-sectional area is restricted from having an excess increase in the low-pressure passage where the gas refrigerant has high flow velocity. Moreover, the noise reduction component is added only to the connecting device 16 that is located the nearest to the evaporator 14, so that the noise is restricted from being heard by an occupant in the passenger compartment with economical (low-cost) composition.

Figure 2:
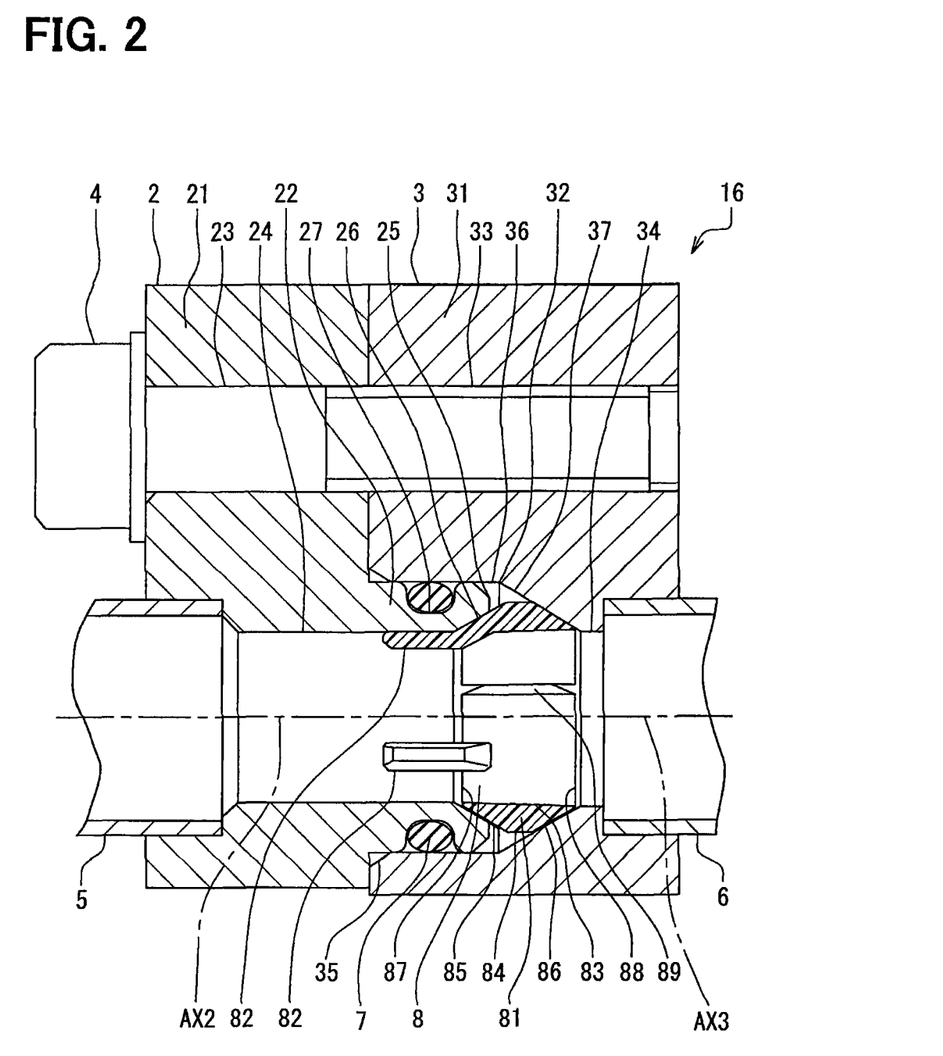
FIG. 2 is a cross-sectional view illustrating the fluid passage connecting device.

FIG. 2 is a cross-sectional view illustrating the fluid passage connecting device 16 of the first embodiment. In FIG. 2, an axis direction AX2, AX3 is defined. A direction intersecting perpendicularly with the axis direction AX2, AX3 is defined as a radial direction, and a direction along with the circumference of the axis direction AX2, AX3 is defined as a circumference direction.

As shown in FIG. 2, the fluid passage connecting device 16 has a first block 2, a second block 3, a bolt 4, a first piping 5, a second piping 6, an O-ring 7, and a ring component 8. The first block 2 and the first piping 5 correspond to a first component which defines a first passage. The second block 3 and the second piping 6 correspond to a second component which defines a second passage. The first passage and the second passage are to be connected with each other.

The bolt 4 is a fix component that fixes and tightens the first component and the second component with each other. The O-ring 7 is a seal component arranged between the first component and the second component, and restricts fluid in the passage from leaking outside. The ring component 8 restricts an excess variation in the passage sectional area at a communication part through which the first passage and the second passage communicate with each other.

The first block 2 is made of metal such as aluminum alloy. The first block 2 has a main part 21 having approximately rectangular parallelepiped shape. The main part 21 has a convex portion 22, a through hole 23, and a passage hole 24. The first block 2 corresponds to a first component which defines the passage hole 24 as a first passage. The convex portion 22 is a cylindrical portion projected from the main part 21 in the axis direction AX2. The through hole 23 accepts the bolt 4.

The convex portion 22 and the passage hole 24 have the same axis AX2 as a center axis. The internal surface of the convex portion 22 defines the passage hole 24. The convex portion 22 has a tip end 25 and a first inner end surface 26 on the inner side of the tip end 25 in the radial direction. An inside diameter of the first inner end surface 26 is gradually increased toward the tip end 25. The inner end surface 26 is a recess-shaped cone surface defined by recessing from the tip end 25 of the convex portion 22. The inner end surface 26 is defined of a tapered surface centering on the axis AX2. The inner end surface 26 is a part of tip end surface of the convex portion 22. The inner end surface 26 is a tip end surface of the convex portion 22 located the nearest to the passage hole 24. An annular groove 27 is defined on an outer surface of the convex portion 22 and extends in the circumference direction, and accommodates the O-ring 7.

The second block 3 is made of metal such as aluminum alloy. The second block 3 has a main part 31 having approximately rectangular parallelepiped shape. The main part 31 has a concave portion 32, a hole 33, and a passage hole 34. The second block 3 is a second component which defines the passage hole 34 as a second passage. The second block 3 is connected with the first block 2 in a manner that the passage hole 24 and the passage hole 34 communicate with each other. The concave portion 32 is a cylindrical hollow part defined in the main part 31. The hole 33 accepts the bolt 4. A thread is defined on the inner surface of the hole 33, and receives the bolt 4.

The concave portion 32 and the passage hole 34 have the same axis AX3 as a center axis. The concave portion 32 accepts the convex portion 22. The convex portion 22 is inserted into the concave portion 32 in a manner that the axis direction AX2 and the axis direction AX3 are coincident with each other. The internal surface of the concave portion 32 defines a space which accepts the convex portion 22. An open end of the concave portion 32 has an expansion part 35 gradually expanded in the radial direction as extending toward the end in the axis direction. The expansion part 35 is defined of a tapered surface centering on the axis AX3. The concave portion 32 has a cylindrical inner surface 36 opposing to the outer surface of the convex portion 22. The cylindrical inner surface 36 extends in parallel with the outer surface of the convex portion 22. The cylindrical inner surface 36 is in contact with the O-ring 7.

The concave portion 32 has a second inner end surface 37 which connects the cylindrical inner surface 36 and the passage hole 34 with each other. An inside diameter of the inner end surface 37 is gradually increased as extending toward the cylindrical inner surface 36 from the passage hole 34. The inner end surface 37 may correspond to a bottom surface of the concave portion 32. The inner end surface 37 is a recess-shaped cone surface defined by recessing further from the cylindrical inner surface 36. The inner end surface 37 is defined of a tapered surface centering on the axis AX3. The inner end surface 37 is located not to contact the tip end 25 of the convex portion 22.

That is, the depth of the concave portion 32 is set larger than a protrusion dimension of the convex portion 22, so that the inner end surface 37 does not contact the tip end 25 in the state where the first block 2 and the second block 3 are tightened and fixed to have a predetermined regular position relationship. For this reason, the tip end 25 and the inner end surface 37 are positioned to be distanced from each other. The communication part is defined between the passage hole 24 and the passage hole 34, so that the passage hole 24 and the passage hole 34 communicate with each other through the communication part.

The bolt 4 is made of metal such as iron. When the bolt 4 is inserted into the hole 33, the first block 2 and the second block 3 are fixed and tightened with each other. The bolt 4 is a fastening component which fastens the first block 2 and the second block 3 with each other so as to be fixed. The fastening component is constructed by the bolt 4, the through hole 23, and the hole 33. The hole 33 may be replaced with a through hole and a nut.

The first piping 5 and the second piping 6 are made of metal such as aluminum alloy. The first piping 5 and the second piping 6 are disposed downstream of the evaporator 14 in FIG. 1. The first piping 5 is joined to the first block 2 by brazing. The second piping 6 is joined to the second block 3 by brazing.

The O-ring 7 is made of rubber. The O-ring 7 is accommodated and received by the annular groove 27. The O-ring 7 tightly contacts the bottom surface of the annular groove 27 and the cylindrical inner surface 36 so that a required sealing property can be obtained in the state where the convex portion 22 is inserted into the concave portion 32. The O-ring 7 is located between the first block 2 and the second block 3 in the axis direction, and corresponds to a seal component which provides sealing properties between the passage hole 24 and the passage hole 34. The annular groove 27, the O-ring 7, and the cylindrical inner surface 36 construct a sealing structure between the convex portion 22 and the concave portion 32 in the radial direction. The seal structure in the radial direction permits relative movement between the convex portion 22 and the concave portion 32 in the axis direction.

A clearance is defined between the convex portion 22 and the concave portion 32, and expands outward in the radial direction from the passage hole 24 or the passage hole 34. The clearance is defined between the tip end 25 and the second inner end surface 37 opposing to each other in the axis direction, and is defined between the first inner end surface 26 and the second inner end surface 37. The clearance works as a dimensional tolerance for assembling the first block 2 and the second block 3, and the assembling is permitted due to the clearance, so that the clearance may be necessary.

An imaginary cylindrical inner surface is defined to linearly connect the inner surface of the passage hole 24 to the inner surface of the passage hole 34. The clearance is located on the outer side of the imaginary cylindrical inner surface in the radial direction. The clearance has an annular shape completely continuing in the circumference direction. The clearance has an approximately triangle or trapezoid cross-section shape, in which the imaginary cylindrical inner surface corresponds to a base side and the first inner end surface 26 and the second inner end surface 37 correspond to two oblique sides.

The ring component 8 is made of resin material so that the ring component 8 easily has elastic deformation in the radial direction. The ring component 8 is made of material easy to have elastic deformation inward in the radial direction by being inserted between the first block 2 and the second block 3. For example, the ring component 8 is made of polyacetal resin (POM).

The ring component 8 is located adjacent to the communication part defined between the passage hole 24 and the passage hole 34 rather than the O-ring 7 corresponding to the seal component. The ring component 8 is located to surround the communication part so as to bury the outer edge of the communication part. The ring component 8 is located to directly face the fluid passage. The ring component 8 hardly has sealing properties compared with the sealing properties of the O-ring 7. The ring component 8 has an annular main part 81 and at least one projection part 82.

The main part 81 is arranged between the convex portion 22 and the concave portion 32. The main part 81 is interposed between the convex portion 22 and the concave portion 32 in the axis direction. The main part 81 buries the clearance generated between the convex portion 22 and the concave portion 32. The main part 81 is located between the passage hole 24 and the passage hole 34 in the axis direction.

Figure 3:
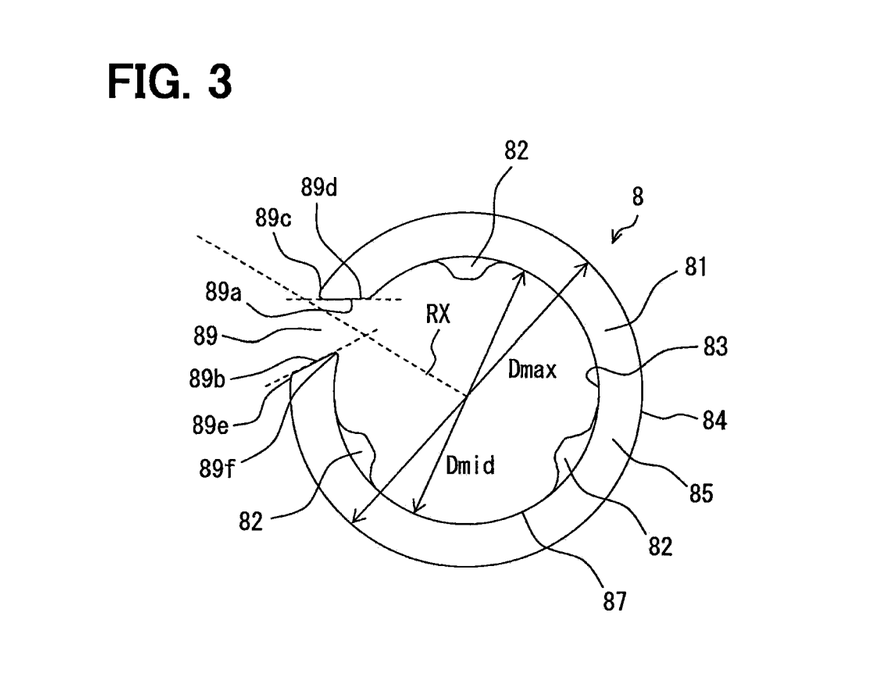
FIG. 3 is a plan view illustrating a ring component of the fluid passage connecting device in free state.

The projection part 82 extends in the axis direction from the main part 81 toward the passage hole 24. The projection part 82 extends along the inner surface of the passage hole 24 from the main part 81. As shown in FIG. 3, the projection part 82 is projected from an inner surface 83 slightly inward in the radial direction. The ring component 8 has a plurality of the projection parts 82 having the same shape. The plural projection parts 82 are disposed through equal intervals in the circumference direction of the ring component 8.

The main part 81 has an approximately cylindrical shape. The inner surface 83 of the main part 81 is defined by a cylindrical inner surface. The inner surface 83 is located to approximately correspond to the imaginary cylindrical inner surface which linearly connects the inner surface of the passage hole 24 to the inner surface of the passage hole 34. The inner surface 83 restricts an excess increase in the passage between the convex portion 22 and the concave portion 32. In this embodiment, the inside diameter of the passage hole 24 is slightly smaller than the inside diameter of the passage hole 34. For this reason, the inner surface 83 is slightly inclined in a manner that the inside diameter of the inner surface 83 gradually increases toward the passage hole 34 from the passage hole 24.

The main part 81 has an outer surface constructed by a cylindrical outer surface 84, a first cone surface 85 and a second cone surface 86. The main part 81 is thick in the radial direction at the center section in the axis direction, and becomes thinner toward both ends in the axis direction. The outside diameter of the main part 81 is the largest at the center section in the axis direction, and becomes smaller at the both ends in the axis direction than the largest diameter. The main part 81 has the shape in a manner that the diameter gradually becomes smaller from the cylindrical outer surface 84 toward the cone surfaces 85, 86. The outer surface of the main part 81 forms a cone, spindle, drum, or barrel shape.

The outer surface of the main part 81 has the cylindrical outer surface 84, the first cone surface 85 and the second cone surface 86. The cylindrical outer surface 84 is defined by an outer surface of a cylinder. The cylindrical outer surface 84 is located in the center section of the main part 81 in the axis direction.

The first cone surface 85 is defined on a first axial end of the main part 81 opposing to the convex portion 22. The first cone surface 85 of the main part 81 is a projection-shaped cone surface projecting toward the axial end. The first cone surface 85 is constructed by a tapered surface which extends along the first inner end surface 26. The first cone surface 85 is offered by an outer circumference surface of a truncated cone. The first cone surface 85 is positioned to oppose the first inner end surface 26 of the first block 2. The first cone surface 85 is in contact with the first inner end surface 26.

The second cone surface 86 is defined on a second axial end of the main part 81 opposite from the first axial end. The second cone surface 86 of the main part 81 is a projection-shaped cone surface projecting toward the axial end. The second cone surface 86 is constructed by a tapered surface which extends along the second inner end surface 37. The second cone surface 86 is offered by an outer circumference surface of a truncated cone. The second cone surface 86 is positioned to oppose the second inner end surface 37 of the second block 3. The second cone surface 86 is in contact with the second inner end surface 37.

The first cone surface 85 and the second cone surface 86 define an annular slant face on both sides of the main part 81, respectively, in the axis direction, so that the outside diameter of the main part 81 gradually becomes smaller as extending to the both sides in the axis direction.

An edge 87 of the main part 81 opposing to the first block 2 is positioned adjacent to a boundary line between the passage hole 24 and the first inner end surface 26. The edge 87 is positioned within the range of the first inner end surface 26 in the axis direction. The edge 87 does not extend into the range of the passage hole 24 in the axis direction. The edge 87 is an annular edge. The inside diameter of the circumference defined by the edge 87 is smaller than the inside diameter of the passage hole 24.

An edge 88 of the main part 81 opposing to the second block 3 is positioned adjacent to a boundary line between the passage hole 34 and the second inner end surface 37. The edge 88 is positioned within the range of the second inner end surface 37 in the axis direction. The edge 88 does not extend into the range of the passage hole 34 in the axis direction. The edge 88 is an annular edge. The inside diameter of the circumference defined by the edge 88 is smaller than the inside diameter of the passage hole 34.

The distance between the edge 87 and the edge 88 in the axis direction (i.e., the axial dimension of the main part 81) is equal to or smaller than the distance between the passage hole 24 and the passage hole 34 in the axis direction (i.e., the axial dimension of the clearance).

As shown in FIG. 3, the main part 81 has a discontinuity 89. The annular main part 81 discontinues in the circumference direction at the discontinuity 89. The discontinuity 89 is formed only at one place of the annular main part 81 in the circumference direction. The discontinuity 89 passes through the main part 81 both in the radial direction and in the axis direction. The discontinuity 89 may be referred as slit or cut in the main part 81. Due to the discontinuity 89, the main part 81 has an approximately C-shape. As shown in a difference between FIG. 3 and FIG. 4, the circumference dimension of the discontinuity 89 is varied in accordance with a deformation of the ring component 8 in the radial direction.

In FIG. 3, the ring component 8 is in free state, and is illustrated to be seen from the first block 2. The ring component 8 has three projection parts 82 arranged at equal intervals. The discontinuity 89 of the main part 81 has two end faces 89*a* and 89*b*. The end faces 89*a* and 89*b* are constructed by slant surface inclined relative to a radial direction RX of the annular main part 81. The end faces 89*a* and 89*b* are inclined in the same direction relative to the radial direction RX.

An edge 89*c* of the end face 89*a* located outside in the radial direction is projected in the circumference direction from an edge 89*d* of the end face 89*a* located inside in the radial direction. An edge 89*f* of the end face 89*b* located inside in the radial direction is projected in the circumference direction from an edge 89*e* of the end face 89*b* located outside in the radial direction. The end faces 89*a* and 89*b* oppose to each other in the circumference direction of the ring component 8. The circumference dimension between the end face 89*a* and the end face 89*b* (i.e., the circumference dimension of the discontinuity 89) causes the main part 81 to easily have elastic deformation and allows the main part 81 to contract in the radial direction.

The ring component 8 is manufactured by molding resin. As shown in FIG. 3, the ring component 8 is molded to have the shape that the discontinuity 89 is opened widely. In the free state where the ring component 8 does not receive compressive force, the end faces 89*a* and 89*b* of the ring component 8 are separated from each other such that the end faces 89*a* and 89*b* do not overlap with each other in the radial direction.

The outside diameter of the cylindrical outer surface 84 has the maximum diameter Dmax in the free state. The maximum diameter Dmax is larger than the inside diameter of the passage hole 24, and is larger than the inside diameter of the passage hole 34. The maximum diameter Dmax is larger than the maximum inside diameter of the inner end surface 26. The maximum diameter Dmax is smaller than the inside diameter of the cylindrical inner surface 36.

The inside diameter of the cylindrical inner surface 83 and the edge 87 has a medium diameter Dmid in the free state. The inside diameter of the edge 88 also has the medium diameter Dmid in the free state. The medium diameter Dmid is larger than the inside diameter of the passage hole 24. The medium diameter Dmid is larger than the inside diameter of the passage hole 34. When an inscribed circle is defined to be inscribed with the plural projection parts 82 in the free state, the medium diameter Dmid is equal to or slightly larger than a diameter of the inscribed circle.

The medium diameter Dmid may be set to be slightly larger or smaller than the maximum diameter of the first inner end surface 26 (i.e., the diameter of the boundary line between the first inner end surface 26 and the tip end 25). The ring component 8 has the shape in a manner that the projection part 82 and the first cone surface 85 are able to be inserted into the convex portion 22 by compressing the ring component 8 slightly in the radial direction. The shape of the ring component 8 makes it possible to hold the ring component 8 itself inside the convex portion 22.

Figure 4:
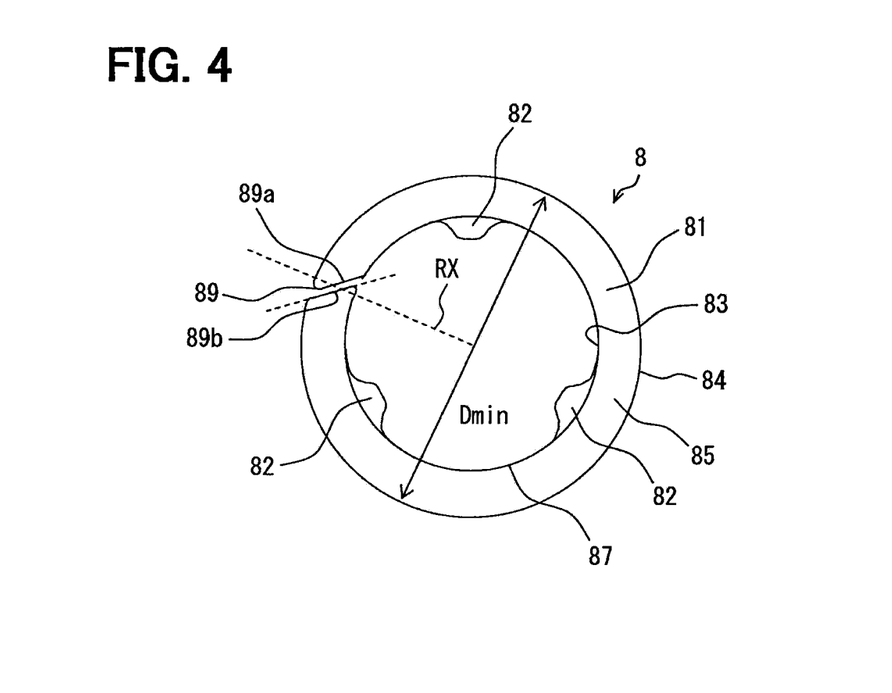
FIG. 4 is a plan view illustrating the ring component of the fluid passage connecting device in contraction state.

In FIG. 4, the ring component 8 is in contracted state, and is illustrated in the state where the first block 2 and the second block 3 are tightened with each other. The ring component 8 is compressed in the radial direction with approximately the maximum level. In the state where the first block 2 and the second block 3 are tightened with each other, the end face 89a and the end face 89b are positioned to partially overlap in the radial direction. As a result, the clearance defined by the discontinuity 89 is inclined relative to the radial direction RX.

In the state where the first block 2 and the second block 3 are tightened with each other, the main part 81 is compressed in the radial direction. Therefore, in this state, the discontinuity 89 is made narrower to be closed, and the outside diameter of the cylindrical outer surface 84 has the minimum diameter Dmin. The minimum diameter Dmin is set sufficiently larger than the inside diameter of the passage hole 24 and the inside diameter of the passage hole 34. The circumference dimension of the discontinuity 89 is set to limit the minimum diameter Dmin, so that the ring component 8 is restricted from protruding into the passage 24, 34.

The production method of the fluid passage connecting device 16 will be described. The ring component 8 is molded in a manner that the inner surface 83 linearly connects the passage hole 24 to the passage hole 34 when the ring component 8 is deformed by being interposed between the first block 2 and the second block 3. The ring component 8 is produced in a manner that the medium diameter Dmid of the main part 81 becomes larger than the inside diameter of the passage hole 24, 34 located adjacent to the edge 87, 88. The ring component 8 is molded in a manner that the inside diameter of the inscribed circle, in which the plural projection parts 82 are inscribed, becomes slightly larger than the inside diameter of the passage hole 24.

The O-ring 7 is mounted to the first block 2, and the ring component 8 is mounted to the first block 2. The process at which the ring component 8 is mounted to the first block 2 may be referred as a preassembling process. Then, the first block 2 and the second block 3 are combined, and tightened with each other using the bolt 4.

In a preassembling process, the ring component 8 is placed in a manner that the plural projection parts 82 are positioned in the passage hole 34. At this time, the plural projection parts 82 are inserted toward the passage hole 24 from the first inner end surface 26. In this process, the ring component 8 is compressed in the radial direction. The ring component 8 is inserted into the convex portion 22 until the first cone surface 85 contacts the first inner end surface 26. The first inner end surface 26 and the first cone surface 85 offer the slant-face contact which compressing the ring component 8 in the radial direction, as the ring component 8 is pushed in. Therefore, the ring component 8 is compressed inward in the radial direction by the contact with the first inner end surface 26 and the first cone surface 85.

The main part 81 tries to spread outward in the radial direction with the elastic power of the main part 81. For this reason, the plural projection parts 82 are forced into the passage hole 24, and the plural projection parts 82 are stopped in the passage hole 24 by frictional force. As a result, the ring component 8 is held in the convex portion 22 with the elastic power of the ring component 8. Thus, the main part 81 of the ring component 8 offers an elastic component which pushes the projection part 82 toward the inner surface of the passage hole 24.

The first cone surface 85 of the ring component 8 is fitted with the first inner end surface 26. For this reason, the ring component 8 is stably held on the convex portion 22, while the convex portion 22 is located to extend upward. Furthermore, because the projection part 82 is deeply inserted into inside of the convex portion 22, the ring component 8 is more stably held by the convex portion 22. In addition, because the plural projection parts 82 spread outward in the radial direction in the passage hole 24, the ring component 8 and the convex portion 22 are coupled with each other by friction.

As a result, even if the convex portion 22 is located to extend downward, the ring component 8 is stably held on the convex portion 22. When the projection part 82 is forced on the inner surface of the passage hole 24, the ring component 8 can be stably held to the first block 2. Furthermore, the slant-face contact between the first inner end surface 26 and the ring component 8 automatically controls the center axis of the ring component 8 to coincide with the axis AX2. For this reason, the inner surface 83 of the ring component 8 is coaxially arranged to have the same axis AX2.

The first block 2, to which the ring component 8 is fixed, is combined with the second block 3 by inserting the convex portion 22 into the concave portion 32. In this process, the second cone surface 86 of the ring component 8 directly contacts the second inner end surface 37. The second inner end surface 37 and the second cone surface 86 offers the slant-face contact compressing the ring component 8 in the radial direction, as the ring component 8 is pushed in. Therefore, the ring component 8 is compressed inward in the radial direction by the contact with the second inner end surface 37. At this time, the slant-face contact between the second inner end surface 37 and the ring component 8 automatically controls the center axis of the ring component 8 to coincide with the axis AX3. For this reason, the inner surface 83 of the ring component 8 is coaxially arranged to have the same axis AX3.

When the first block 2 and the second block 3 are combined with each other, the plural projection parts 82 move inward in the radial direction from the inner surface of the passage hole 24, and may separate from the inner surface of the passage hole 24. At this time, because the ring component 8 is accommodated between the convex portion 22 and the concave portion 32, the ring component 8 is restricted from falling out.

If the first block 2 and the second block 3 are tightened with each other using the bolt 4, the ring component 8 is positioned at the predetermined regulation position between the first block 2 and the second block 3. At this time, the position of the ring component 8 may slightly shift from the predetermined regulation position, due to error in the softness of the ring component 8 and the shapes of the components. For example, the position of the ring component 8 may slightly shift in the axis direction. However, the inner surface 83 of the ring component 8 causes smooth connection between the passage hole 24 and the passage holes 34.

Furthermore, in the manufacture process of the fluid passage connecting device 16, the ring component 8 is deformed to be suit with the shapes of the first block 2 and the second block 3. The discontinuity 89 facilitates the deformation of the ring component 8 in the radial direction. The discontinuity 89 can control the circumference dimension of the ring component 8.

Figure 5:
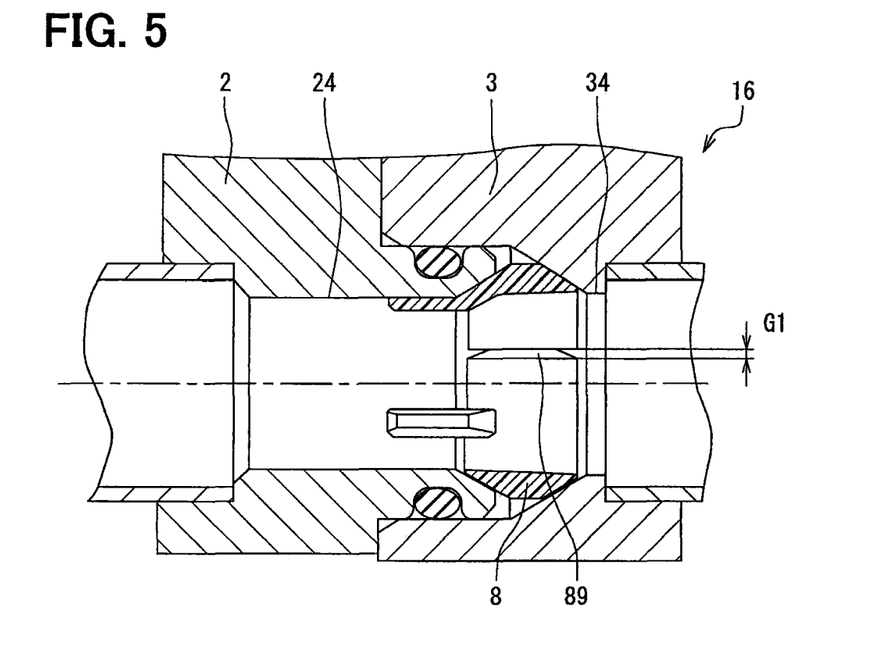
FIG. 5 is a cross-sectional view illustrating an assembled state example of the fluid passage connecting device.
Figure 6:
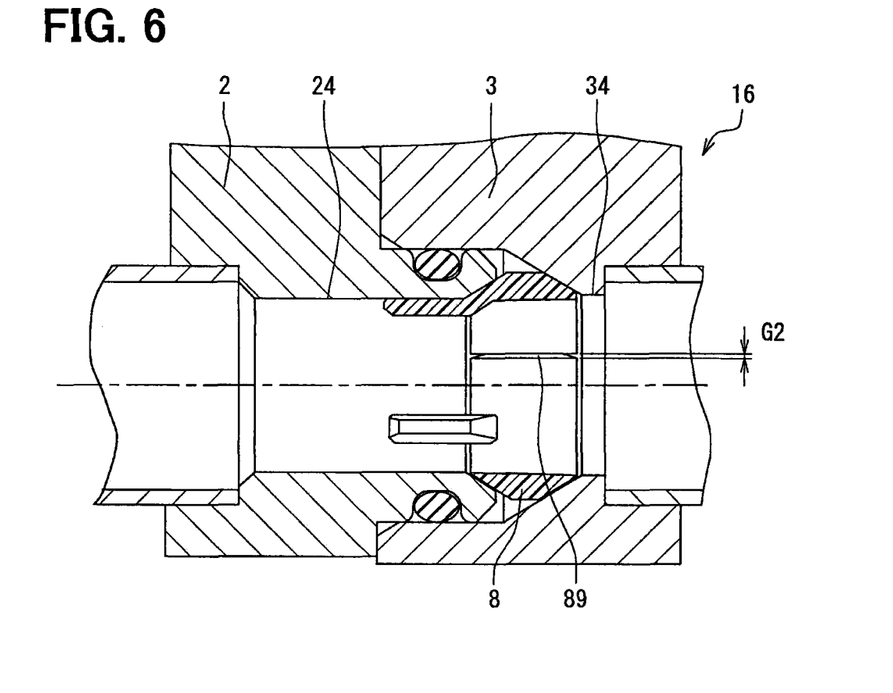
FIG. 6 is a cross-sectional view illustrating an assembled state example of the fluid passage connecting device.

FIG. 5 is a partial cross-sectional view illustrating an assembled state example of the fluid passage connecting device 16. FIG. 6 is a partial cross-sectional view illustrating another assembled state example of the fluid passage connecting device 16. The distance between the passage hole 24 and the passage hole 34 in FIG. 6 is slightly smaller than the distance between the passage hole 24 and the passage hole 34 in FIG. 5, because the length of the convex portion 22 of FIG. 6 is slightly longer than the length of the convex portion 22 of FIG. 5, for example. The difference in the size may be produced by the error in the manufacturing process.

The discontinuity 89 defines a clearance G1 in FIG. 5, and the discontinuity 89 defines a clearance G2 in FIG. 6. As the distance between the passage hole 24 and the passage hole 34 becomes short, the compression of the ring component 8 becomes large in the radial direction, so that the ring component 8 is deformed to have smaller inside diameter and outside diameter. For this reason, as the distance between the passage hole 24 and the passage hole 34 is shorter, the clearance dimension of the discontinuity 89 becomes smaller.

The ring component 8 can be deformed to absorb the error in the shapes of the first block 2 and the second block 3. Moreover, the ring component 8 can be deformed to absorb the error in the positions of the first block 2 and the second block 3. Furthermore, the ring component 8 is automatically positioned at the predetermined position, absorbing the error in the shapes, and provides the inner surface 83 which smoothly connects between the passage hole 24 and the passage holes 34.

Second Embodiment

Figure 7:
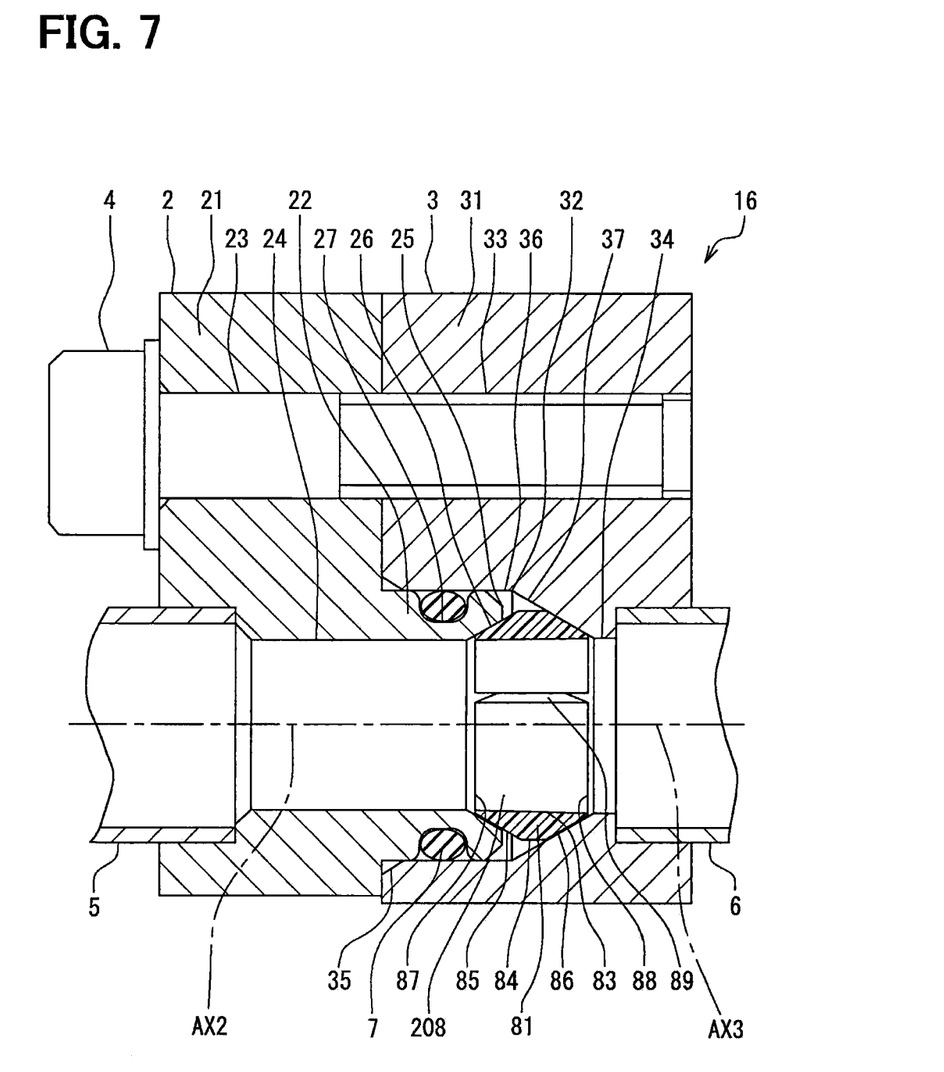
FIG. 7 is a cross-sectional view illustrating a fluid passage connecting device according to a second embodiment.
Figure 8:
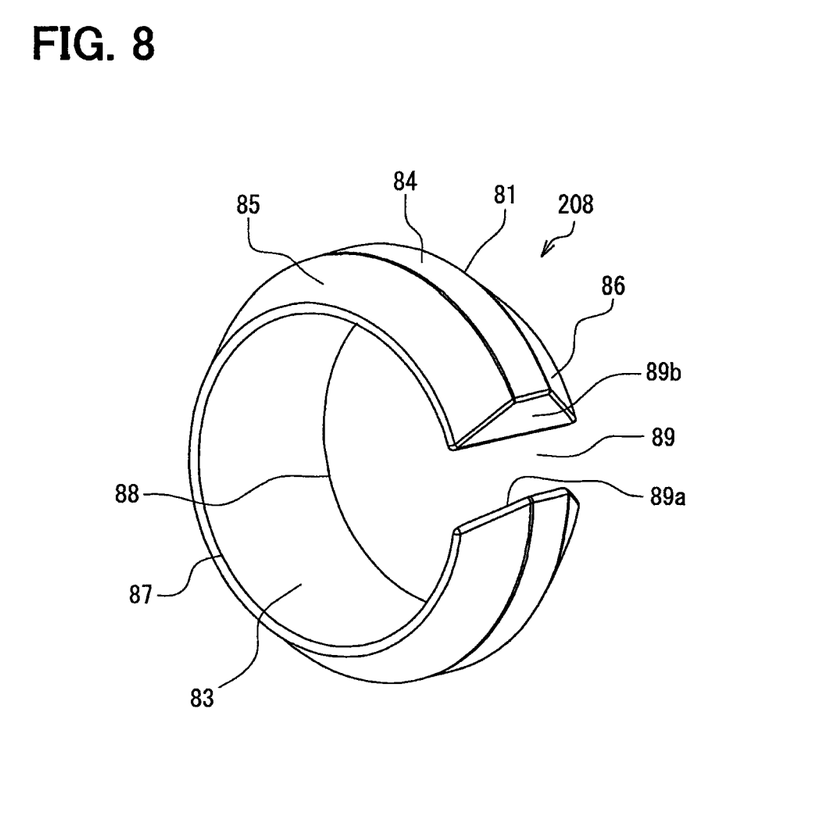
FIG. 8 is a perspective view illustrating a ring component of the fluid passage connecting device of the second embodiment.

FIG. 7 is a cross-sectional view illustrating the fluid passage connecting device 16 according to a second embodiment. FIG. 8 is a perspective view illustrating a ring component 208 of the fluid passage connecting device 16 of the second embodiment. In the first embodiment, the ring component 8 is certainly held on the convex portion 22 by defining the plural projection parts 82.

In the second embodiment, the projection part 82 is eliminated in the ring component 208 of the second embodiment. The ring component 208 is held on the convex portion 22 by inserting the first cone surface 85 to contact the first inner end surface 26.

Third Embodiment

Figure 9:
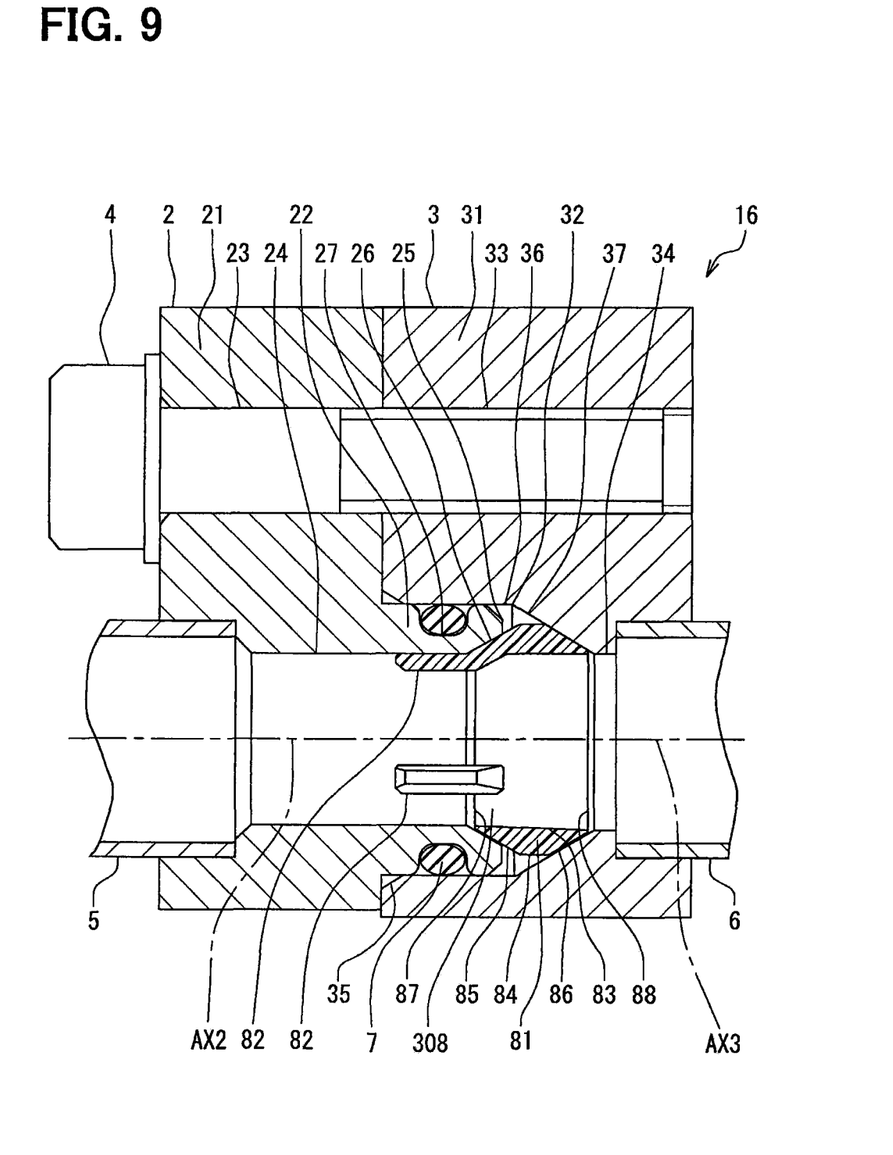
FIG. 9 is a cross-sectional view illustrating a fluid passage connecting device according to a third embodiment.

FIG. 9 is a cross-sectional view illustrating the fluid passage connecting device 16 according to a third embodiment. In the first embodiment, the ring component 8 can be easily deformed due to the discontinuity 89.

In the third embodiment, the discontinuity 89 is eliminated in the ring component 308. The ring component 308 can be deformed by the softness of the resin material. Therefore, the ring component 308 can be deformed to offer the inner surface 83 which restricts the variation in the passage sectional area between the passage hole 24 and the passage hole 34, even when the shapes of the first block 2 and the second block 3 have error.

Fourth Embodiment

Figure 10:
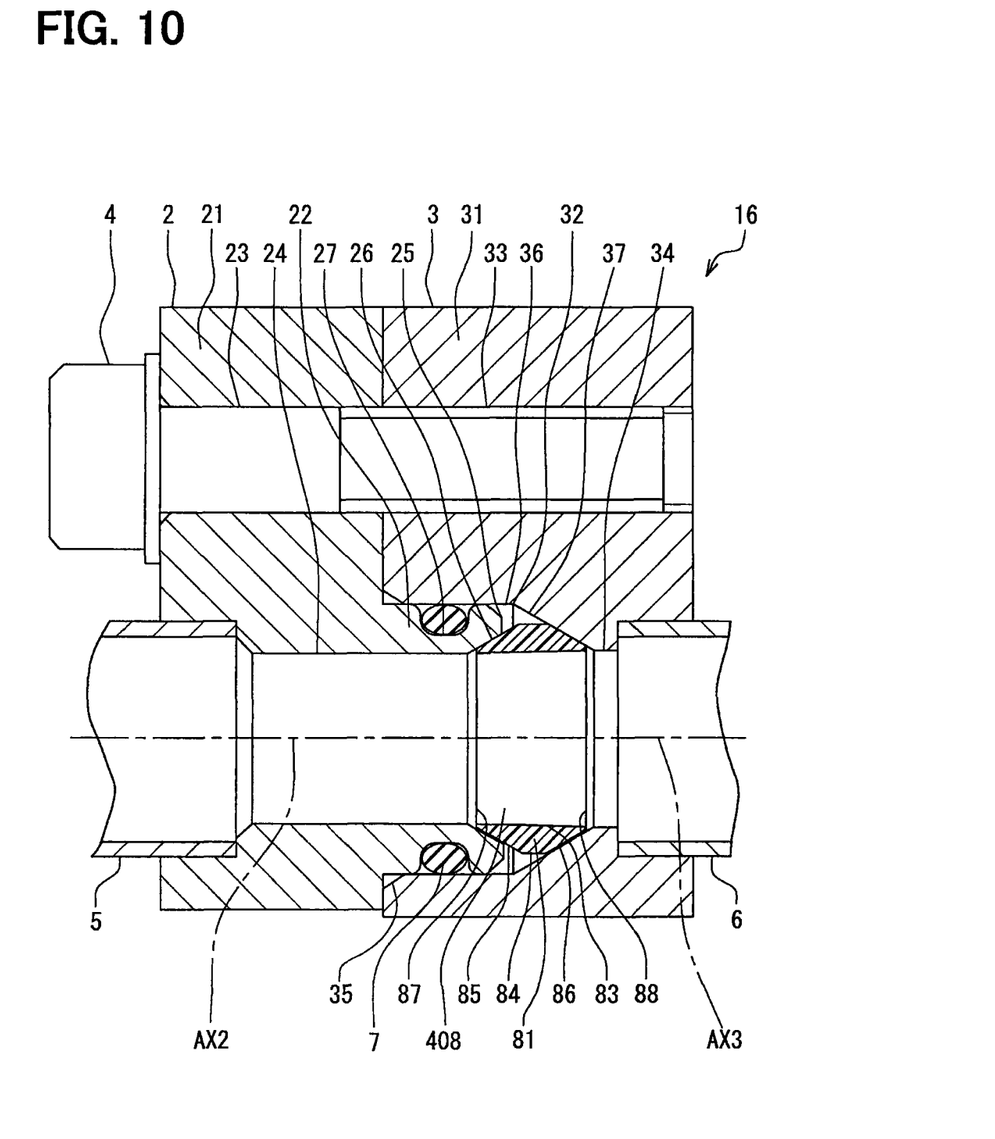
FIG. 10 is a cross-sectional view illustrating a fluid passage connecting device according to a fourth embodiment.

FIG. 10 is a cross-sectional view illustrating the fluid passage connecting device 16 according to a fourth embodiment. The projection part 82 and the discontinuity 89 of the first embodiment are eliminated in the ring component 408 of the fourth embodiment.

Fifth Embodiment

Figure 11:
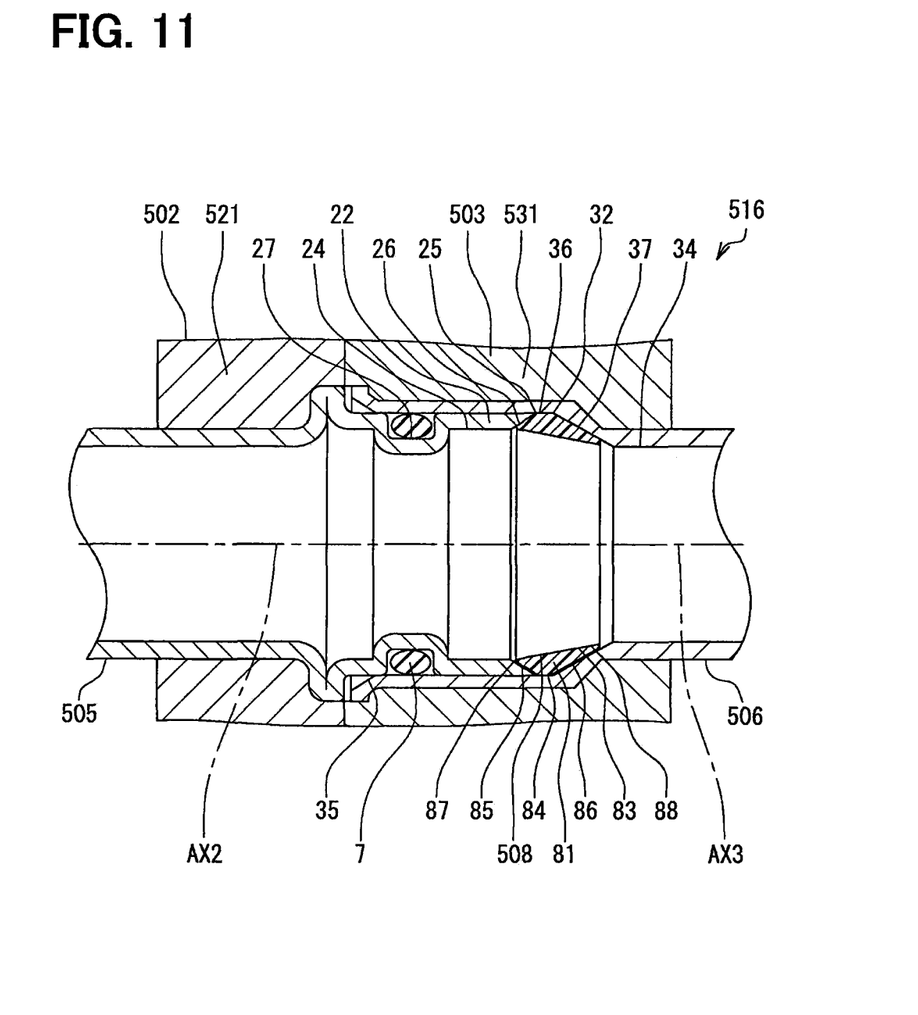
FIG. 11 is a cross-sectional view illustrating a fluid passage connecting device according to a fifth embodiment.

FIG. 11 is a cross-sectional view illustrating the fluid passage connecting device 16 according to a fifth embodiment. In the above embodiment, the convex portion 22 is offered by the first block 2.

In the fifth embodiment, a piping 505 has the convex portion 22. The piping 505 is arranged and fixed to penetrate a main part 521 of a first block 502. An end of the piping 505 is processed to offer the convex portion 22. In this embodiment, the first component is offered by the first block 502 and the piping 505.

In the above embodiment, the concave portion 32 is offered by the second block 3. In the fifth embodiment, a piping 506 has the concave portion 32. The piping 506 is arranged and fixed to penetrate a main part 531 of a second block 503. An end of the piping 506 is processed to offer the concave portion 32. In this embodiment, the second component is offered by the second block 503 and the piping 506.

Alternatively, at least one of the convex portion 22 and the concave portion 32 may be offered by the end of the piping 505 or the piping 506.

In the above embodiment, the ring component 8 has the cylindrical shape with almost symmetrical inside diameter in the axis direction. Alternatively, as shown in FIG. 11, a ring component 509 of the fifth embodiment may have unsymmetrical shape in which the inside diameter of one end in the axis direction is larger than that of the other end. The ring component 508 has a funnel or taper cone shape. Also in this embodiment, the inner surface 83 linearly connects between the inner surface of the passage hole 24 and the inner surfaces of the passage hole 34.

Other Embodiments

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

The ring component 8, 208, 308, 408, 508 is arranged only in the low-pressure connecting device 16 in the above embodiment. Alternatively, the ring component 8, 208, 308, 408, 508 may be arranged also or only in the high-pressure connecting device 15 if noise occurs in the high-pressure connecting device 15. Moreover, the ring component 8, 208, 308, 408, 508 may be arranged not only in the connecting device 16 the nearest to the evaporator 14 but in other low-pressure connecting devices.

In the above embodiment, the first block 2 and the second block 3 are combined after the ring component 8, 208, 308, 408, 508 is temporary fixed to the tip end of the convex portion 22. Alternatively, the first block 2 and the second block 3 are combined after the ring component 8, 208, 308, 408, 508 is temporary fixed to inside the concave portion 32. In such a case, the plural projection parts 82 may be defined to extend toward the passage hole 34 from the main part 81 of the ring component 8. Moreover, plural projection parts may be arranged to extend from the main part 81 of the ring component 8 to both directions. Thus, the ring component 8 can have the projection part 82 which extends toward at least one inside of the passage hole 24 and the passage hole 34. The projection part 82 can be arranged over at least one inner surface of the passage hole 24 and the passage hole 34.

In the above embodiment, the plural projection parts 82 are arranged along the inner surface of the passage hole 24 (or the passage hole 34). Alternatively, annular projection parts having circular shape or C-shape may be prepared.

In the above embodiment, the slant-face contact is offered on the both sides of the ring component 8 in the axis direction. Specifically, as shown in FIG. 2, the projection-shaped cone surface 85 is located on the left side of the ring component 8, and the first inner end surface 26 having the recess-shaped cone surface is arranged to correspond to the projection-shaped cone surface 85. Moreover, the projection-shaped cone surface 86 is located on the right side of the ring component 8, and the second inner end surface 37 having the recess-shaped cone surface is arranged to correspond to the projection-shaped cone surface 86.

Alternatively, the slant-face contact may be defined only between the ring component 8 and the first block 2, or only between the ring component 8 and the second block 3. For example, the slant-face contact may be provided only between the recess-shaped cone surface 26 and the projection-shaped cone surface 85, or only between the recess-shaped cone surface 37 and the projection-shaped cone surface 86.

Specifically, an annular plane portion may be provided to contact the tip end 25 and to spread perpendicularly to the axis AX2 and the axis AX3, instead of the cone surface 85. In this case, the ring component 8 is held by the convex portion 22 due to the projection part 82. Moreover, the center axis position of the ring component 8 may be automatically controlled by the slant-face contact between the cone surface 86 and the second inner end surface 37. Further, the cone surface 86 and the second inner end surface 37 may be offered by an annular plane portion spreading perpendicularly to the axis AX2 and the axis AX3.

In the above embodiment, the plural projection parts 82 are spread outward in the radial direction by the elasticity of the main part 81. Alternatively, the projection parts 82 may be spread outward in the radial direction due to the elasticity of the projection parts 82.

Such changes and modifications are to be understood as being within the scope of the present disclosure as defined by the appended claims.

What is claimed is:

1. A fluid passage connecting device comprising:
    a first component defining a first passage;
    a second component defining a second passage, the second component being connected with the first component in a manner that the first passage and the second passage communicate with each other through a communication part;
    a seal component disposed between the first component and the second component to provide a sealing between the first passage and the second passage; and
    a ring component arranged to surround the communication part, the ring component being located adjacent to the communication part rather than the seal component, wherein the ring component restricts the communication part from having an excess increase in a cross-sectional area,
    the ring component has an inner surface which connects an inner surface of the first passage and an inner surface of the second passage with each other,
    the ring component has a first projection-shaped cone surface on a first end of the ring component in an axis direction, and a second projection-shaped cone surface on a second end of the ring component in the axis direction,
    the first component has a first recess-shaped cone surface having the same axis with the first passage, and the first projection-shaped cone surface of the ring component and the first recess-shaped cone surface contact each other through a first slant-contact face,
    the second component has a second recess-shaped cone surface having the same axis with the second passage, and the second projection-shaped cone surface of the ring component and the second recess-shaped cone surface contact with each other through a second slant-contact face,
    the ring component is made of a material that is elastically deformable inward in a radial direction by being interposed between the first component and the second component in the axis direction,
    the ring component has a C-shape having a discontinuity defined by a clearance, and
    the clearance has a circumference dimension that is varied in accordance with a deformation of the ring component in the radial direction.

2. The fluid passage connecting device according to claim 1, wherein
    the ring component has a projection part which projects toward at least one of the first passage and the second passage.

3. The fluid passage connecting device according to claim 2, wherein
    the projection part is arranged to extend along at least one of the inner surface of the first passage and the inner surface of the second passage, and
    the ring component has an elastic part which pushes the projection part toward the inner surface of the first passage or the inner surface of the second passage.

4. The fluid passage connecting device according to claim 3, wherein
    the elastic part is constructed of a main part of the ring component, and the main part is made of resin.

5. A refrigerating cycle apparatus comprising the fluid passage connecting device according to claim 1.

6. The refrigerating cycle apparatus according to claim 5, wherein
    the fluid passage connecting device is arranged only in a passage through which low-pressure refrigerant flows.

7. The fluid passage connecting device according to claim 1, wherein
    the clearance of the discontinuity becomes smaller in a circumference direction as a distance between the first passage and the second passage becomes shorter in the axis direction.

8. The fluid passage connecting device according to claim 1, wherein
    the first component and the second component are located on an outer side of the ring component in the radial direction.

* * * * *